(12) United States Patent
Stegmeier

(10) Patent No.: US 6,416,007 B1
(45) Date of Patent: Jul. 9, 2002

(54) BELT WINDER FOR A VEHICLE OCCUPANT SEAT BELT

(75) Inventor: Michael Stegmeier, Schwäbisch-Gmünd (DE)

(73) Assignee: TRW Occupant Restraint Systems GmbH & Co. KG, Alfdorf (DE)

(*) Notice: Subject to any disclaimer, the term of this patent is extended or adjusted under 35 U.S.C. 154(b) by 0 days.

(21) Appl. No.: 09/622,767

(22) PCT Filed: Dec. 18, 1998

(86) PCT No.: PCT/EP98/08351
§ 371 (c)(1),
(2), (4) Date: Aug. 22, 2000

(87) PCT Pub. No.: WO99/42343
PCT Pub. Date: Aug. 26, 1999

(51) Int. Cl.$^7$ ................................................ B60R 22/28
(52) U.S. Cl. ..................................................... 242/379.1
(58) Field of Search ....................... 242/379.1; 280/805, 280/806; 297/470, 471, 472, 478

(56) References Cited

U.S. PATENT DOCUMENTS

| 3,857,528 | A | | 12/1974 | Fiala | 242/379.1 |
| 5,611,498 | A | * | 3/1997 | Miller et al. | 242/379.1 |
| 5,799,893 | A | * | 9/1998 | Miller et al. | 242/379.1 |
| 5,836,534 | A | | 11/1998 | Bohmler | 242/379.1 |

FOREIGN PATENT DOCUMENTS

| DE | 2222742 | 11/1973 |
| DE | 2844028 | 4/1980 |
| DE | 4436810 | 4/1996 |
| DE | 29513942 | 2/1997 |
| DE | 29622181 | 5/1997 |
| DE | 19653510 | 6/1997 |
| WO | 9749583 | 12/1997 |

* cited by examiner

Primary Examiner—John M. Jillions
(74) Attorney, Agent, or Firm—Tarolli, Sundheim, Covell, Tummino & Szabo L.L.P.

(57) ABSTRACT

A belt retractor for a vehicle occupant seat belt, comprising a belt reel (14) rotatably mounted in a housing (12), a torsion bar (21) extending in the interior of said belt reel (14) and connected by its first axial end (22) non-rotatably to said belt reel (14) and by its second axial end (26) non-rotatably to a ratchet disk (18) provided with a ratchet toothing (16), and a load-bearing ratchet pawl (42) capable of being brought into engagement with said ratchet toothing (16) to block said belt reel (14), is characterized in that said torsion bar comprises a first section (28) as well as a second section (30), the cross-section of which is smaller than that of said first section (28), that an arresting portion (24) is configured between said first and second sections (28, 30) and that a bypass element (34) is provided which can be transposed from a starting position connecting said arresting portion (24) non-rotatably to said second end (26) of said torsion bar (21) into a release position in which said arresting portion (24) is rotatable relative to said second axial end (26) of said torsion bar.

7 Claims, 4 Drawing Sheets

BELT WINDER FOR A VEHICLE OCCUPANT SEAT BELT

The invention relates to a belt retractor for a vehicle occupant seat belt, comprising a belt reel rotatably mounted in a housing, a torsion bar extending in the interior of the belt reel and connected by its first axial end non-rotatably to the belt reel and by its second axial end non-rotatably to a ratchet disk provided with a ratchet toothing, and a load-bearing ratchet pawl capable of being brought into engagement with the ratchet toothing to block the belt reel.

The torsion bar in the interior of the belt reel serves to limit the maximum force acting in the seat belt, especially when the vehicle is involved in an accident, to a degree preventing injury of a restrained vehicle occupant. Limiting the force is achieved in that as of a critical belt webbing force, rotation of the belt reel relative to the non-rotatably mounted ratchet disk is made possible, as a result of which a specific length of the belt webbing can be dispensed from the belt reel. This dispensed length of belt webbing is available as an additional length for decelerating, more particularly, the trunk of the vehicle occupant.

As regards the trunk, the risk of injury for a vehicle occupant is dictated almost exclusively by the force acting as a whole on the trunk. If only the seat belt is used to restrain the vehicle occupant, the force acting on the trunk results exclusively from the force in the belt webbing. If, however, a gas bag is additionally used, which is deployed in front of the vehicle occupant when the vehicle is involved in an accident, to ensure a controlled deceleration of the vehicle occupant, the load on the trunk as of a specific forward dislocation is composed of the force introduced into the trunk by the seat belt as well as the force introduced into the trunk by the gas bag. So that the overall load acting on the trunk does not exceed a predetermined degree, it would be desirable for the force acting in the seat belt to decrease as of that point in time at which the trunk of the vehicle occupant comes into contact with the gas bag. Preferably, the change in the force counteracting dispensing of the belt webbing should be brought about by as simple means as possible, it being further desirable that the characteristic of the belt webbing force versus released belt webbing length is freely adjustable within broad limits so that the belt retractor can be adapted to the individual mounting conditions in the vehicle.

The invention provides a belt retractor satisfying these requirements. In accordance with the invention it is provided for in the case of a belt retractor of the kind as stated at the outset that the torsion bar comprises a first section as well as a second section, the cross-section of which is smaller than that of the first section, that an arresting portion is configured between the first and second sections and that a bypass element is provided which can be transposed from a starting position connecting the arresting portion non-rotatably to the second end of the torsion bar into a release position in which the arresting portion is rotatable relative to the second axial end of the torsion bar. In this configuration, release of the belt webbing occurs initially only with twisting of the first section of the torsion bar; the second section of the torsion bar is not involved in twisting since it is bypassed by the bypass element. Depending on the respective mounting situation, the bypass element is transposed, following a predetermined rotation of the belt reel relative to the ratchet disk, from the starting position into the release position. At this point, also the second section of the torsion bar is involved in the rotation of the belt reel relative to the ratchet disk. Since the second section has a smaller cross-section. than the first section, a lesser belt webbing dispensing force is needed. The point in time of transposing the bypass element from the starting position into the release position is preferably selected such that it coincides with the start of the diving action of the trunk of the vehicle occupant into the deployed gas bag.

In accordance with a preferred embodiment it is provided for that the arresting portion and the second axial end of the torsion bar are splined and that the bypass element is a bypass sleeve splined complementary in its interior. In this embodiment the bypass element is configured as a sleeve which is particularly simple to fabricate, slidingly arranged on the arresting portion and on the second axial end of the torsion bar. For transposing the bypass sleeve from the starting position into the release position, a variety of mechanisms of simple design may be provided. For example, a positioning cylinder may be employed which is activated by means of a pyrotechnic charge. Preferably, however, the bypass element is transposed from the starting position into the release position mechanically.

In accordance with a preferred embodiment it is furthermore provided for that the first axial end of the torsion bar is also splined and that a positioning sleeve is arranged non-rotatably on the first axial end of the torsion bar, this positioning sleeve being splined complementary in its interior and comprising an end face facing the second axial end of the torsion bar, which end face is configured as a control cam with which the end face of the bypass sleeve facing the first axial end of the torsion bar is in contact. In this configuration a rotation of the arresting portion relative to the first axial end of the torsion bar is directly exploited to transpose the bypass sleeve from the starting position into the release position. By suitably configuring the control cam it can be set as of which rotation of the first axial end of the torsion bar relative to the arresting portion the second section of the torsion bar is involved in the rotation of the belt reel. A limitation exists only to the extent that the release position needs to be attained at the latest after one revolution of the arresting portion relative to the first axial end of the torsion bar.

If more than one revolution of the belt reel is desired before also the second section of the torsion bar is involved in limiting the force, a thread may be configured, for example, on the bypass sleeve in which a counterpiece engages such that a transposition of the bypass sleeve from the starting position into the release position is possible. Depending on the pitch of the thread, the point in time at which the bypass sleeve is transposed into the release position can be set to any desired degree of relative rotation between the arresting portion and the first axial end of the torsion bar.

Advantageous aspects of the invention read from the sub-claims.

The invention will now be described below with reference to a preferred embodiment as illustrated in the drawings in which.

Figure 1:
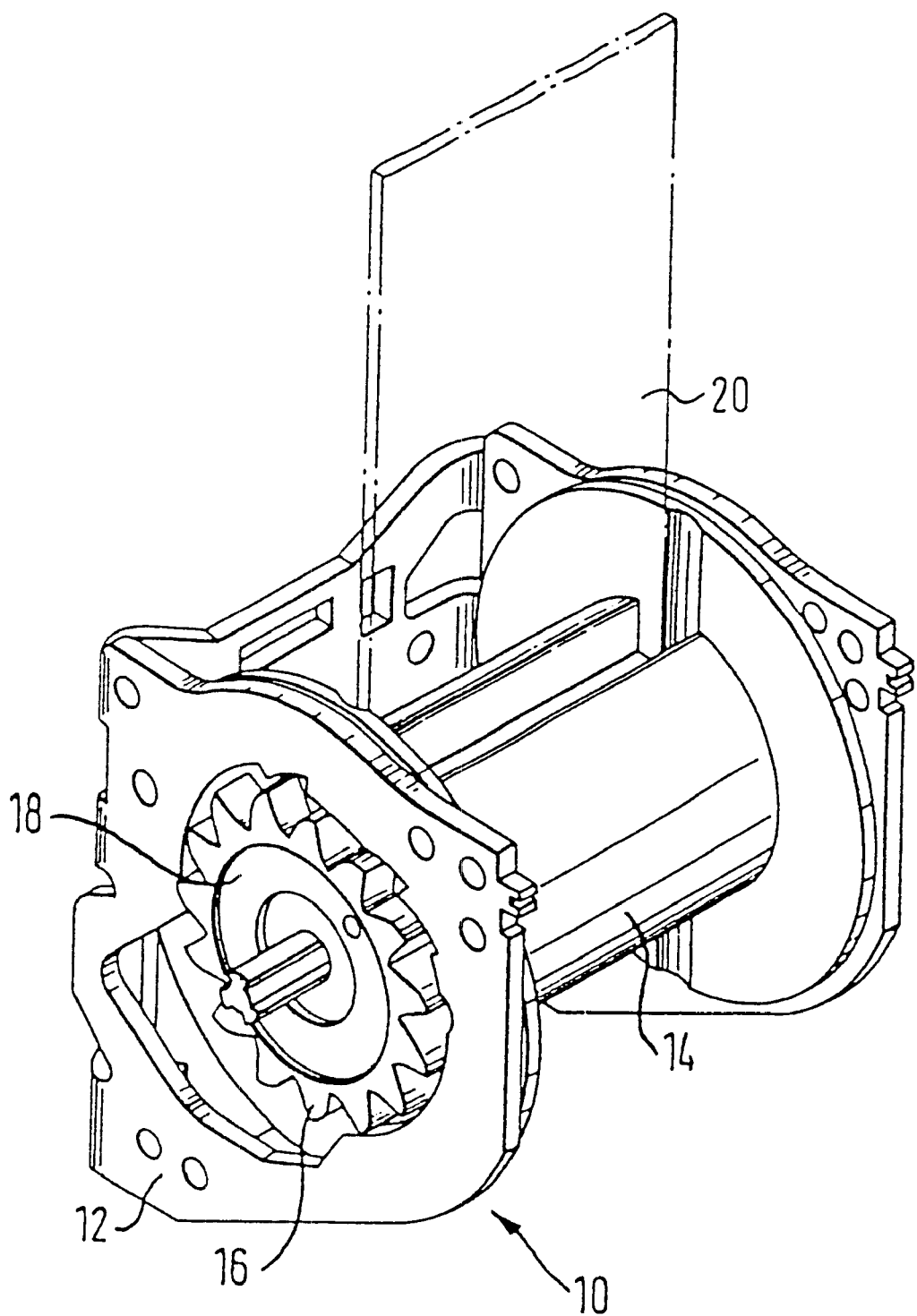
FIG. 1 is a schematic view of a belt retractor for a vehicle occupant seat belt.

Referring now to FIG. 1 there is illustrated in perspective a belt retractor in accordance with the invention. The belt retractor 10 contains a housing 12 in which a belt reel 14 is rotatably mounted. Provided at one axial end of the belt reel 14 is a ratchet disk 18. Configured on the outer circumference of the ratchet disk 18 is a ratchet toothing 16 into which a ratchet pawl (not shown) can be caused to engage. A seat belt 20 can be wound on the belt reel 14.

Figure 2:
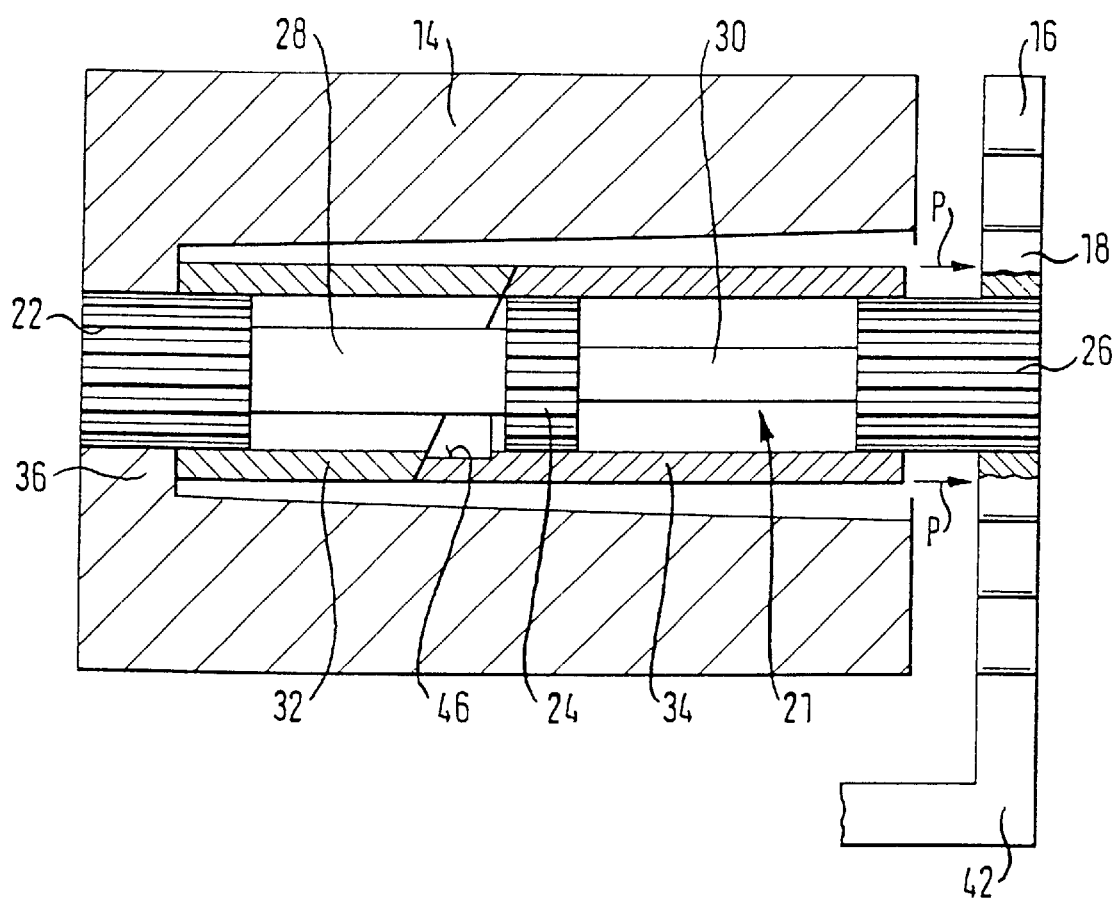
FIG. 2 is a schematic cross-sectional view of a belt reel including a torsion bar for a belt retractor in accordance with the invention.

Referring now to FIG. 2 there is illustrated the schematic cross-section of the belt reel 14 with the ratchet disk 18. Located in the interior of the belt reel is a torsion bar 21 consisting of a first axial end 22, an arresting portion 24, a second axial end 26 as well as a first section 28 between the first axial end 22 and the arresting portion 24 and a second section 30 between the arresting portion 24 and the second axial end 26. The second section 30 of the torsion bar has a smaller cross-section than the first section 28. The first axial end 22, the second axial end 26 as well as the arresting portion 24 of the torsion bar are splined.

The first axial end 22 of the torsion bar is non-rotatably connected to the belt reel 14 by means of the spline. The second axial end 26 of the torsion bar is non-rotatably connected to the ratchet disk 18.

Figure 3:
FIG. 3 is an illustration of the developed shape of a positioning sleeve as may be used in the belt retractor in accordance with the invention.
Figure 4:
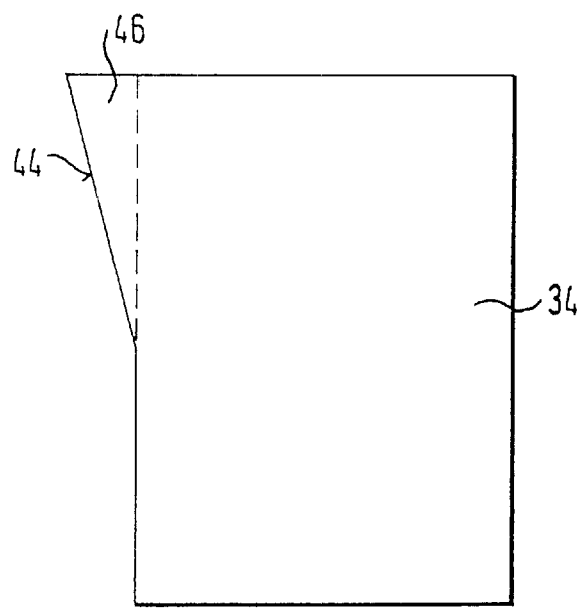
FIG. 4 is an illustration of the developed shape of a bypass sleeve as may be used in the belt retractor in accordance with the invention.

Also arranged in the interior of the belt reel are a positioning sleeve 32 and a bypass sleeve 34. The developed shapes of these two sleeves are illustrated in FIGS. 3 and 4. The positioning sleeve 32 is splined on the inside, complementary to the spline of the first axial end 22 of the torsion bar, and is mounted on the first axial end 22 of the torsion bar such that it is non-rotatably connected thereto whilst being in contact with the face wall of the belt reel 14. The axial end of the positioning sleeve 32 facing the second axial end 26 of the torsion bar extends so far towards the second axial end 26 of the torsion bar to be just out of contact with the arresting portion 24. The end face of the positioning sleeve 32 facing the second axial end 26 of the torsion bar is configured as a control cam 40.

The inner side of the bypass sleeve 34 is also splined complementary to that of the arresting portion 24 and of the second axial end 26. In the starting position as shown in FIG. 2 the axial end of the bypass sleeve 34—shown on the left in FIG. 2—is arranged non-rotatably on the arresting portion 24 whilst the axial end of the bypass sleeve 34 shown on the right in FIG. 2—is arranged non-rotatably on the second axial end 26 of the torsion bar. The end face 44 of the bypass sleeve 34 facing the first axial end 22 of the torsion bar is in contact with the control cam 40 of the positioning sleeve 32.

When, in the starting position of the bypass sleeve 34, the ratchet pawl 42 indicated schematically in FIG. 2 is caused to engage the ratchet toothing 16 of the ratchet wheel 18, then the second axial end 26 of the torsion bar is initially blocked via the ratchet wheel 18. Due to the high moment of torsional resistance made available by the bypass sleeve 34, the arresting portion 24 is also coupled non-rotatably to the second axial end 26 of the torsion bar; the second portion 30 receiving (practically) no load whatsoever. If now, with the ratchet wheel 18 blocked, a load is applied to the belt reel 14 by means of the belt webbing 20, this initially results in only the first section 28 of the torsion bar being twisted. This torsion comes along with the bypass sleeve 34 being rotated relative to the positioning sleeve 32 since the positioning sleeve 32 is connected non-rotatably to the first axial end 22 whilst the bypass sleeve 34 rotates together with the second axial end 26 and the arresting portion 24 of the torsion bar. During this rotation, the end face 44 of the bypass sleeve 34 facing the first axial end 22 of the torsion bar is shifted to the right in the direction of the arrows P as evident from FIG. 2 by the control cam 40 of the positioning sleeve 32. With increasing rotation of the first axial end 22 relative to the arresting portion 24 of the torsion bar, the bypass sleeve 34 is shifted so far to the right that it no longer engages the spline of the arresting portion 24. This position, in which a rotation of the arresting portion 24 relative to the second axial end 26 of the torsion bar is possible, is termed the release position. So that the uncoupling action of the arresting portion 24 from the bypass sleeve 34 occurs smoothly, the spline on the inner side of the bypass sleeve 34 is configured only over a portion which has the same axial length over the full inner circumference; i.e. no spline being provided in a portion 46 beyond this axial length.

The control cam 40 as shown in FIG. 3, together with the complementary end face area 44 as shown in FIG. 4 for the bypass sleeve 34, is merely one example of how the positioning sleeve 32 and the bypass sleeve 34 may be configured. The control cam may also be provided with a larger or even smaller pitch, it being possible, for example, to obtain the control cam by performing a slanting cut through the sleeve provided with the spline on the inner side, i.e. at an angle other than 90° relative to the longitudinal axis of the sleeve. Important in this respect is merely that, following one revolution of the arresting portion 24 relative to the first axial end 22 of the torsion bar at the latest, such an axial shift is made available by the control cam 40 that the bypass sleeve 34 is transposed from the starting position into the release position.

Figure 5:
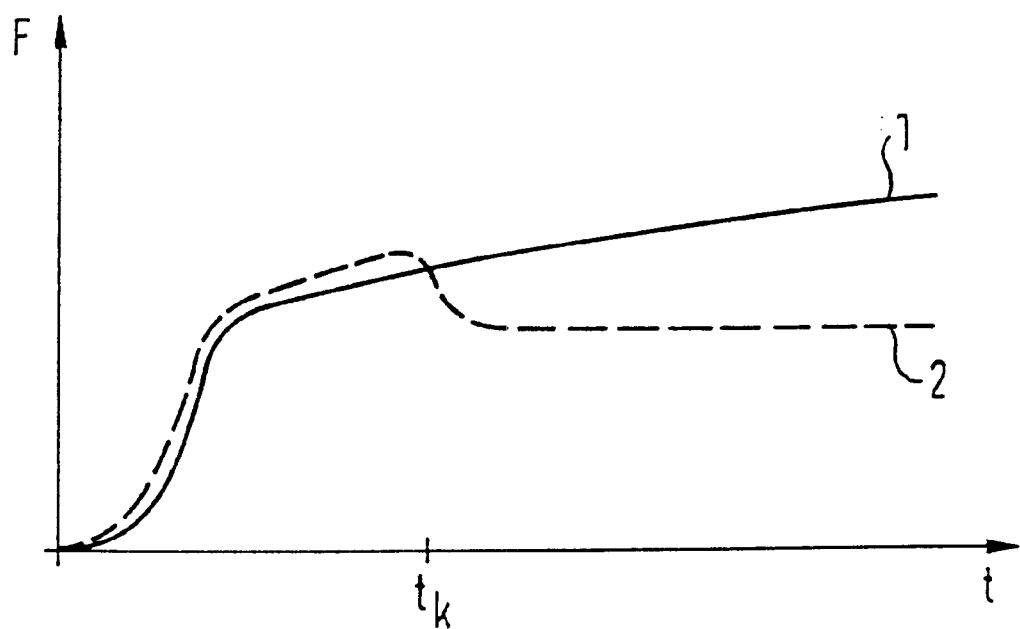
FIG. 5 is a plot of the belt webbing dispensing force versus time for a conventional belt retractor and a belt retractor in accordance with the invention.

Referring now to FIG. 5 there is illustrated a plot of the belt webbing dispensing force F versus time t for a typical head-on collision of a vehicle. The bold line curve 1 represents the profile for a conventional belt retractor including a force limiter. It is evident that the dispensing force of the belt webbing firstly increases sharply before increasing slightly. The broken line curve 2 illustrates the profile of the belt webbing dispensing force for a belt retractor in accordance with the invention. It is evident that up to a point in time $t_k$ the curves 1 and 2 run parallel. As of the point in time $t_k$, however, a reduction in the belt webbing dispensing force occurs in the case of the belt retractor in accordance with the invention. The time $t_k$ represents the point in time at which the bypass sleeve 34 is decoupled from the arresting portion 24, so that in addition to the first section 28 also the second section 30 of the torsion bar is involved in the twisting action. Since the cross-section of the second section 30 is smaller than that of the first section 28, a reduction in the belt webbing dispensing force takes place. The point in time $t_k$ corresponds precisely to the point in time at which the vehicle occupant dives into the deployed gas bag. The decrease in the belt webbing dispensing force at this point in time assures that the overall load on the trunk of the vehicle occupant remains more or less constant.

What is claimed is:

1. A belt retractor for a vehicle occupant seat belt, comprising a belt reel (14) rotatably mounted in a housing (12), a torsion bar (21) extending in the interior of said belt reel (14) and connected by its first axial end (22) non-rotatably to said belt reel (14) and by its second axial end (26) non-rotatably to a ratchet disk (18), and comprising a ratchet toothing (16) as well as a load-bearing ratchet pawl (42) in engagement with said ratchet toothing (16) to block said belt reel (14), said torsion bar having a first section (28) as well as a second section (30), the cross-section of which is smaller than that of said first section (28), an arresting portion (24) being configured between said first and second sections (28, 30) and a bypass element (34) being provided which is transposed from a starting position bridging said second section of said torsion bar into a release position in which said second section of said torsion bar is released, characterized in that a positioning sleeve (32) is arranged non-rotatably on said first axial end of said torsion bar, said positioning sleeve comprising an end face facing said second axial end (26) of said torsion bar, which end face is configured as a control cam (40) with which the end face (44) of said bypass sleeve (34) facing said first axial end (22) of said torsion bar is in contact.

2. The belt retractor as set forth in claim 1, characterized in that said control cam (40) is configured such that, after a predetermined rotation of said arresting portion (24) relative to said first axial end (26) of said torsion bar, said bypass sleeve (34) is shifted toward said second axial end (26) of said torsion bar to such an extent that said arresting portion (24) no longer engages said bypass sleeve (34).

3. The belt retractor as set forth in claim 1, characterized in that said first axial end (22) of said torsion bar is splined and that said positioning sleeve (32) is splined complementary in its interior.

4. The belt retractor as set forth in claim 1, characterized in that said arresting portion (24) and said second axial end (26) of said torsion bar are splined and that said bypass element is a bypass sleeve (34) splined complementary in its interior.

5. A belt retractor for a vehicle occupant seat belt, comprising a belt reel (14) rotatably mounted in a housing (12), a torsion bar (21) extending in the interior of said belt reel (14) and connected by its first axial end (22) non-rotatably to said belt reel (14) and by its second axial end (26) non-rotatably to a ratchet disk (18), and comprising a ratchet toothing (16) as well as a load-bearing ratchet pawl (42) in engagement with said ratchet toothing (16) to block said belt reel (14), said torsion bar having a first section (28) as well as a second section (30), the cross-section of which is smaller than that of said first section (28), an arresting portion (24) being configured between said first and second sections (28, 30) and a bypass element (34) being provided which is transposed from a starting position bridging said second section of said torsion bar into a release position in which said second section of said torsion bar is released, characterized in that an end face is configured on said bypass sleeve (34) which is engaged by a cam to move said bypass sleeve (34) from said starting position into said release position.

6. A belt retractor for a vehicle occupant seat belt, comprising a belt reel (14) rotatably mounted in a housing (12), a torsion bar (21) extending in the interior of said belt reel (14) and connected by its first axial end (22) non-rotatably to said belt reel (14) and by its second axial end (26) non-rotatably to a ratchet disk (18) provided with a ratchet toothing (16), and a load-bearing ratchet pawl (42) in engagement with said ratchet toothing (16) to block said belt reel (14), characterized in that said torsion bar comprises a first section (28) as well as a second section (30), the cross-section of which is smaller than that of said first section (28), that an arresting portion (24) is configured between said first and second sections (28, 30) and that a bypass element (34) is provided which is transposed from a starting position connecting said arresting portion (24) non-rotatably to said second end (26) of said torsion bar (21) into a release position in which said arresting portion (24) is rotatable relative to said second axial end (26) of said torsion bar, characterized in that said arresting portion (24) and said second axial end (26) of said torsion bar are splined and that said bypass element is a bypass sleeve (34) splined complementary in its interior, characterized in that said first axial end (22) of said torsion bar is also splined and that a positioning sleeve (32) is arranged non-rotatably on said first axial end of said torsion bar, said positioning sleeve being splined complementary in its interior and comprising an end face facing said second axial end (26) of said torsion bar, which end face is configured as a control cam (40) with which an end face (44) of said bypass sleeve (34) facing said first axial end (22) of said torsion bar is in contact.

7. The belt retractor as set forth in claim 6, characterized in that said control cam (40) is configured such that, after a predetermined rotation of said arresting portion (24) relative to said first axial end (26) of said torsion bar, said bypass sleeve (34) is shifted toward said second axial end (26) of said torsion bar to such an extent that said arresting portion (24) no longer engages said bypass sleeve (34).

\* \* \* \* \*

UNITED STATES PATENT AND TRADEMARK OFFICE
CERTIFICATE OF CORRECTION

PATENT NO. : 6,416,007 B1  Page 1 of 1
DATED : July 9, 2002
INVENTOR(S) : Michael Stegmeier It is certified that error appears in the above-identified patent and that said Letters Patent is hereby corrected as shown below:

<u>Title page,</u>
After Item [87], "PCT Pub. Date: Aug. 26, 1999", insert:
-- [30] Foreign Application Priority Data
February 23, 1998 (DE) 298 03 178.7 --.

Signed and Sealed this

Fourth Day of November, 2003

JAMES E. ROGAN
*Director of the United States Patent and Trademark Office*